United States Patent [19]

Fukuda et al.

[11] Patent Number: 4,746,427
[45] Date of Patent: May 24, 1988

[54] OIL FILTER FOR TRANSMISSION

[75] Inventors: Moritoshi Fukuda; Mashaharu Kojima, both of Yokohama, Japan

[73] Assignee: Nifco Inc., Yokohama, Japan

[21] Appl. No.: 904,059

[22] Filed: Sep. 3, 1986

[30] Foreign Application Priority Data

Sep. 9, 1985 [JP] Japan .......................... 60-136803[U]

[51] Int. Cl.⁴ .............................................. B01D 35/06
[52] U.S. Cl. ..................................... 210/223; 210/437; 210/445
[58] Field of Search ................... 123/196 A; 210/168, 210/222, 223, 437, 445, 695; 184/1.5, 6.24, 6.25

[56] References Cited

U.S. PATENT DOCUMENTS 3,784,011  1/1974  Ward .............................. 210/223 X
3,841,489  10/1974 Combest et al. ..................... 210/223
3,890,232  6/1975  Combest et al. ..................... 210/223
4,067,810  1/1978  Sullivan ............................... 210/223

FOREIGN PATENT DOCUMENTS 59-36814  3/1984  Japan .

*Primary Examiner*—Richard V. Fisher
*Assistant Examiner*—W. Gary Jones
*Attorney, Agent, or Firm*—Trexler, Bushnell, Giangiorgi & Blackstone, Ltd.

[57] ABSTRACT

An oil filter for a transmission has a hollow cylindrical structure comprising a cylindrical stem having an oil inlet and a cylindrical net support frame extending from the stem in the lengthwise direction thereof, the stem and net support frame being constituted by a one-piece molding of a synthetic resin, and a cylindrical net supported by the support frame. A magnet holder is provided at an end of the net support frame. Fine iron particles are attracted and removed by a magnet mounted in the magnet holder.

1 Claim, 1 Drawing Sheet

OIL FILTER FOR TRANSMISSION

FIELD OF THE INVENTION AND RELATED ART STATEMENT

This invention relates to an oil filter for filtering oil supplied to an automotive transmission.

Transmission oil is contaminated by intrusion of fine iron particles produced as a result of friction between metal parts. Heretofore, transmissions have been provided with an oil circulation path provided with an oil filter to remove the contaminants.

A well-known oil filter of this type consists of a cylindrical net. This filter net is installed in a tunnel-like oil circulation path to filter oil and remove iron particles and other contaminants contained in the circulated oil. However, there is a limit to the filtering capability of the net and, in particular, it is difficult to filter out very fine iron particles with the filter net.

OBJECT AND SUMMARY OF THE INVENTION

An object of the invention is to provide an oil filter for a transmission, which can filter out even very fine iron particles contained in the transmission oil.

According to the invention there is provided an oil filter for a transmission, which has a hollow cylindrical structure comprising a cylindrical stem having an oil inlet, a support frame extending from the stem in the lengthwise direction thereof, the stem and support frame being constituted by a one-piece molding of a synthetic resin, and a cylindrical net supported by the support frame, and in which a magnet holder is provided integrally at the free end of the support frame, and a magnet is mounted in the magnet holder.

This oil filter is installed in a vertical tunnel-like oil circulation path in the transmission by inserting it in the path from below with its end provided with a magnet directed upwardly. In this state, oil flowing into the oil filter from an inlet provided at the stem is supplied into the cylindrical net and allowed to penetrate the net, whereby impurities are filtered out. The oil emerging through the net is allowed to proceed past the periphery of the magnet provided at the end, whereby fine iron particles that have not been filtered out by the net are attracted and removed by the magnet.

As will be apparent from the description of an embodiment to be made later, the oil filter according to the invention comprises a stem for stably mounting it in the oil circulation path, a support frame extending from the stem and a magnet holder extending from the other end of the support frame, the stem, support frame and magnet holder being constituted by a one-piece molding of a synthetic resin. The magnet holder is cylindrical and is open at the free end. The magnet is mounted in the magnet holder by inserting it from the open end of the magnet holder. The net is inserted at the time of forming the one-piece synthetic resin molding, with a portion of the net buried in the support frame in the lengthwise direction.

The oil filter having this construction according to the invention is inserted in the oil circulation path of the transmission. The contaminated oil flowing into the oil circulation path flows through the stem into the cylindrical net and passes through the net, whereby a major part of the contaminants are filtered out. The oil having passed through the net proceeds through a narrow path between the magnet and the oil circulation path wall, whereby very fine iron particles remaining in the oil are attracted to the magnet, so that the oil is returned to the interior of the transmission in a more perfectly filtered state.

The above and other objects and features of the invention will become more apparent from the following detailed description with reference to the accompanying drawings.

DETAILED DESCRIPTION OF THE PREFERRED EMBODIMENT

Figure 1:
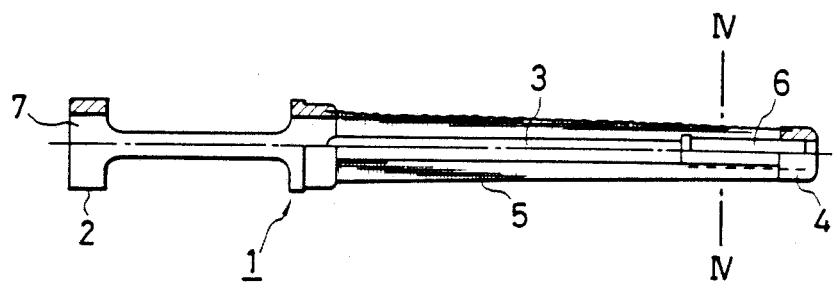
FIG. 1 is a plan view, partly in section, showing an embodiment of the oil filter for a transmission according to the invention.
Figure 2:
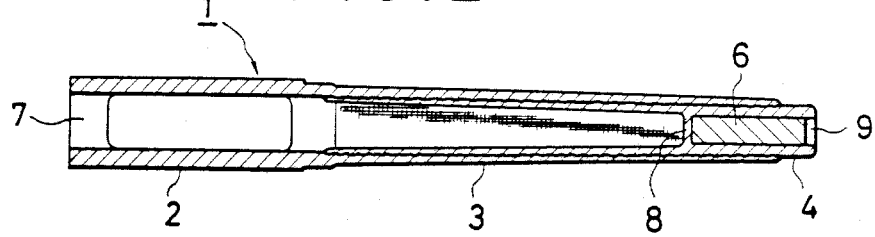
FIG. 2 is a longitudinal sectional view showing the oil filter of FIG. 1.

Now, an embodiment of the transmission oil filter according to the invention will be described with reference to the accompanying drawings. The illustrated oil filter 1 according to the invention comprises a cylindrical stem 2, a support frame 3 extending in the lengthwise direction of the stem from one end thereof, a magnet holder 4 integrally extending from the distal end of the support frame, the magnet holder comprises a pair of substantially parallel arms extending axially from the frame and has inner surfaces which are substantially portions of a cylinder for holding a cylindrical magnet and the arms have a length which is a plurality of times the diameter of the magnet, a cylindrical net 5 integral with the stem 2 and supported by the support frame 3, and a magnet 6 mounted in the magnet holder 4 and attached to the leading end side of the filter.

The stem 2, support frame 3 and magnet holder 4 are constituted by a one-piece molding of a thermoplastic resin, e.g. nylon. The stem 2, which is cylindrical, is open at one end 7 and also has inlet openings formed in its peripheral wall. The support frame 3 extends from the other end of the stem. The net 5, which is a cylindrical metal net, is placed on the support frame such that its interior communicates with the interior of the stem 2.

Figure 3:
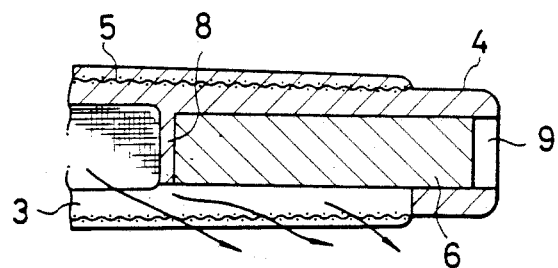
FIG. 3 is a sectional view taken along line III—III in FIG. 4.
Figure 5:
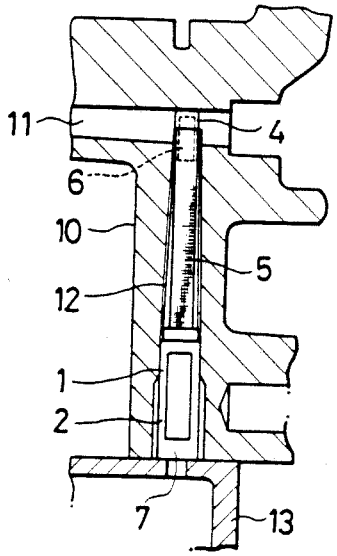
FIG. 5 is a view for explaining the installation of the oil filter in an oil circulation path of a transmission.
Figure 4:
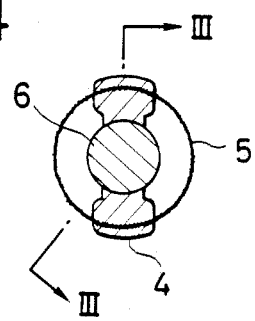
FIG. 4 is a sectional view taken along line IV—IV in FIG. 1.

The magnet holder 4, which is also cylindrical, extends from the other end of the support frame. As shown to an enlarged scale in FIG. 3, the magnet holder is partly within the net 5, and its portion extending within the net 5 is provided with a partition wall 8. Its free end is open as an inlet 9, from which the magnet 6 is inserted.

With the oil filter 1 according to the invention, the net 5 is inserted when molding the aforementioned synthetic resin portion including the stem. After the one-piece molding has been obtained, the magnet 6, which is rod-like, is inserted into the magnet holder from the inlet 9. The magnet is thus mounted by making use of a clamping force produced with expansion of the magnet holder.

The oil filter thus formed is accommodated in a tunnel-like accommodation space 12 provided in an oil circulation path 11 provided in a transmission 10 by inserting it into the space 12 from below. In operation, transmission oil flowing from an oil pan 13 into the oil circulation path is allowed to flow into the oil filter through the inlet 7 of the stem 2 and thence into and through the net 5. Thus, contaminants contained in the oil are filtered out. The oil emerging through the net 5 escapes into the circulation path 11. The oil escaping into the circulation path proceeds through a narrow gap between the magnet 6 accommodated in the magnet holder 4 and the inner wall of the circulation path. Thus, fine iron particles which have not been filtered out by the net are attracted to the surface of the magnet. Thus, contaminants are removed more completely so that cleaner oil is returned to the interior of the transmission.

As has been described in the foregoing, the oil filter according to the invention is not subject to the limit on contaminant removal capability that prior art oil filters have been subjected to and can remove iron particles irrespective of the size thereof with the attracting force of the magnet. Thus, it is possible to obtain a far superior filtering effect than possible with the prior art filters, which are incapable of filtering out fine iron particles.

Further, the magnet holder of the oil filter according to the invention can be formed simultaneously and integrally with the stem and support frame. In addition, the magnet can be mounted by merely inserting it into the magnet holder. Thus, the oil filter according to the invention can be readily manufactured and provided inexpensively.

Further, the oil filter according to the invention is installed for use with the magnet holder directed upwards. The magnet thus can be stably held by the partition wall 8. In order to prevent detachment of the magnet when the oil filter is not in use, the inner wall of a portion of the magnet holder nearer the stem may be tapered so that the magnet is forcibly inserted into the tapered wall. By so doing, the detachment of the magnet can be easily prevented.

What is claimed is:

1. An oil filter for a transmission having a hollow cylindrical structure having an axial dimension and having axially spaced inlet and outlet ends and comprising a coaxial cylindrical stem having an oil inlet adjacent said inlet end, a support frame extending axially from said stem, said stem and support frame being constituted by a one piece molding of a synthetic resin, and a coaxial substantially cylindrical net having an interior and an exterior supported by said support frame and having the interior thereof open to said oil inlet for receipt of contaminated oil to be passed through said screen from said interior to said exterior, wherein a magnet holder is provided integrally with said support frame adjacent said outlet end and extending axially beyond said cylindrical net, and a magnet is mounted in said magnet holder and extending axially beyond said cylindrical net to trap metal particles passing through and axially beyond said net, said magnet holder partially isolating said magnet from the interior of said cylindrical net, said magnet being cylindrical, and said magnet holder comprising a pair of substantially parallel arms extending axially from said frame and having inner surfaces which are substantially portions of a cylinder for holding said cylindrical magnet and said arms having a length which is a plurality of times the diameter of the magnet.

* * * * *